No. 835,698. PATENTED NOV. 13, 1906.
R. BARTHOLOMÄUS.
COMBINATION TOOL.
APPLICATION FILED OCT. 26, 1905.
2 SHEETS—SHEET 1.
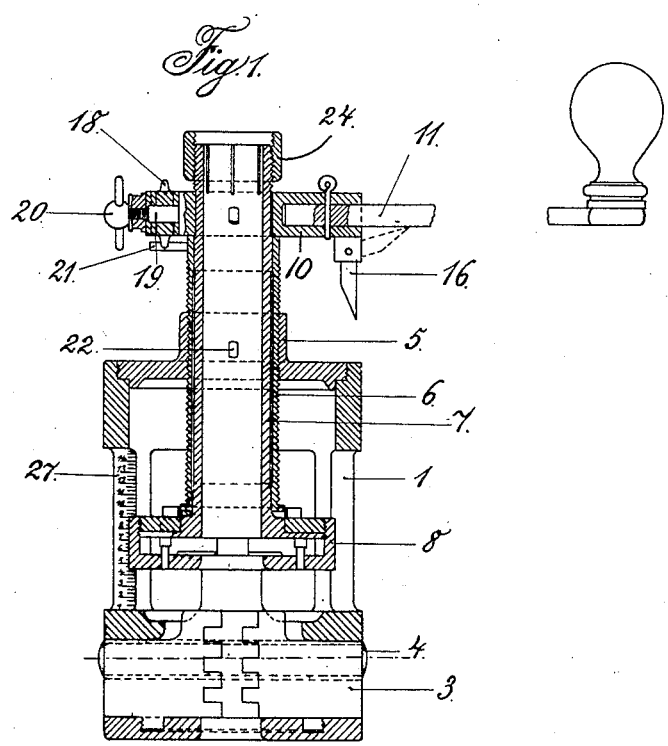
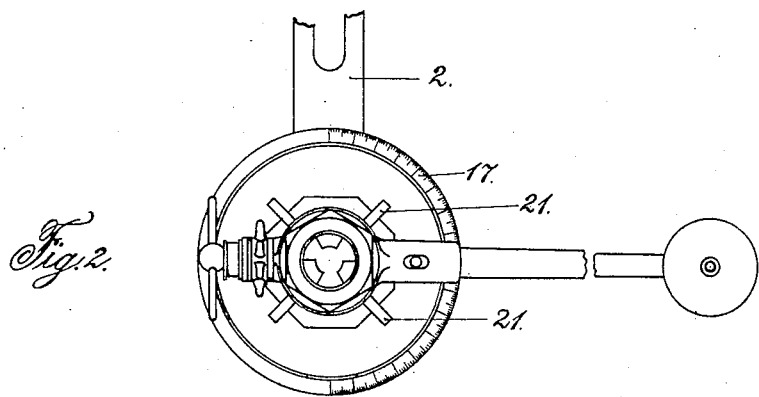
Witnesses:
Eugen Hübmann
B. Lödsin
Inventor:
Rudolf Bartholomäus

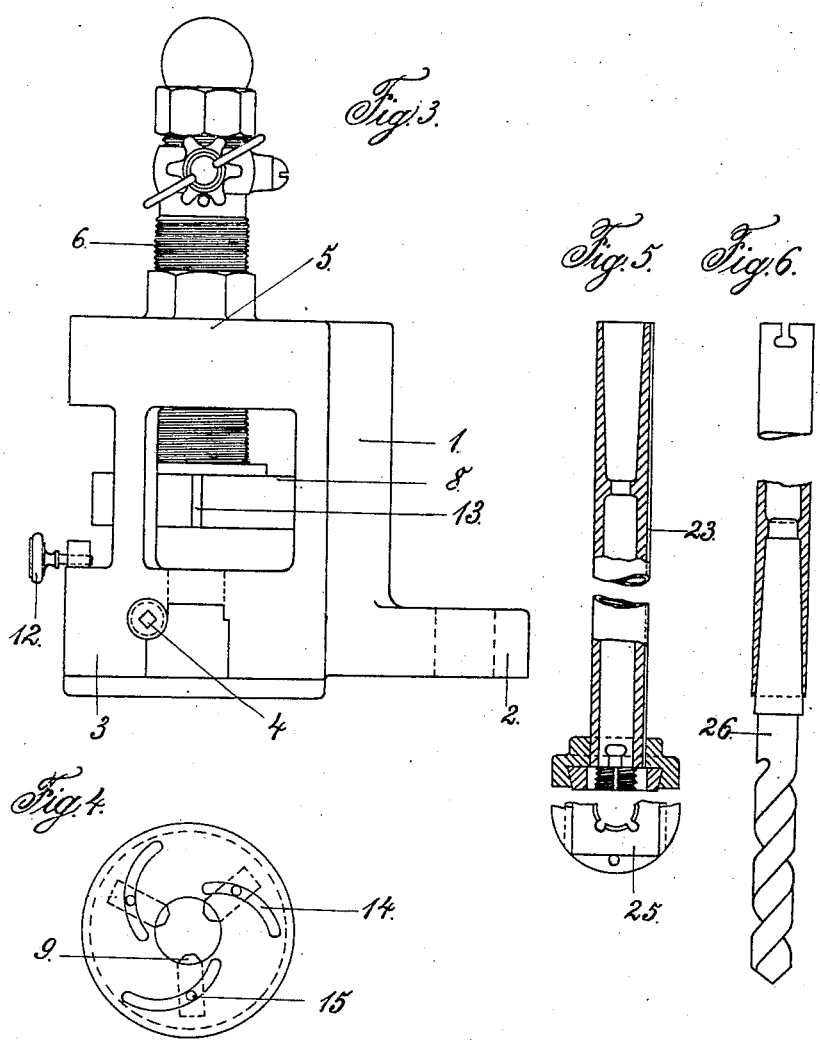

UNITED STATES PATENT OFFICE.

RUDOLF BARTHOLOMÄUS, OF DRESDEN, GERMANY.

COMBINATION-TOOL.

No. 835,698.

Specification of Letters Patent.

Patented Nov. 13, 1906.

Application filed October 26, 1905. Serial No. 284,470.

*To all whom it may concern:*

Be it known that I, RUDOLF BARTHOLO-MÄUS, a subject of the German Emperor, residing at Dresden, Germany, have invented certain new and useful Improvements in Combination-Tools, of which the following is a specification.

The present invention relates to an improved combination-tool which by reason of its comparatively light weight and its general handiness is especially adapted to be carried about by the operator when working away from the shop and which allows of quickly changing from one operation to another.

In the accompanying drawings, Figure 1 represents a vertical sectional elevation, Fig. 2 a plan view, and Fig. 3 a side elevation, of the tool. Figs. 4, 5, and 6 represent, respectively, detail parts for cutting, for screw-threading, and for drilling.

The casing 1, carrying the various operating parts, is to be secured to a vise, a workbench, or other suitable rigid object with its projection 2 and is provided at 3 with a centering-chuck operated by the screw 4 for clamping the work-piece in central position. In the upper part 5 of the casing operates a hollow screw-sleeve 6, within which is rotatably journaled the hollow spindle 7, which carries at its lower end the holder 8 for the cutting-knives 9. As shown, the pins 15 of the cutting-knives 9 are guided in eccentric slots 14 in the cutter-head 8, and by inserting a pin 12 in a groove 13 provided in the casing 8 and rotating the hollow spindle 7 one way or the other by means of the crank-handle 11 these knives will be caused to move toward or away from each other. The pin 12 is slidingly arranged in a suitable bracket on the chuck part 3 and is ordinarily retracted so that it is out of engagement with the cutter-head. For setting the knives, the cutter-head 8 is lowered and the pin 12 inserted in the groove 13, thereby holding the cutter-head rigid.

A pointer 16 moving over a fixed scale 17 on casing 1 shows the position of the knives, which latter are locked in place in any suitable manner well known in the art when set to the proper radial position.

For automatically regulating the advance (feed) of the operating-spindle 7 the following mechanism is employed: The ring 10, to which is secured the crank 11 and which is rigidly secured to the spindle 7, carries a stud 19, upon which rotates between friction-washers a toothed wheel 18. A thumb-screw 20 allows of regulating the degree of friction between toothed wheel and washers. To the upper end of the sleeve 6, which screws up or down in the part 5 of the casing 1, are secured a number of radial pins 21 in such position that upon the crank-handle 11 being actuated these pins 21 mesh with the toothed wheel and the sleeve 6 is caused to intermittently rotate and thereby work up or down in the casing 1. When feeding, the sleeve will descend upon the work-piece until the cutting knives have "bit" when the resistance caused by the biting action of the knives will overcome the frictional resistance between wheel 18 and washers and the wheel 18 will rotate about its stud 19 without further influencing the sleeve 6. The result will be that the operating parts do not descend any farther until the knives have cut their way, when the friction-wheel 18 will come into action again and cause further feeding operation. The operating parts thus gradually work down upon the work-piece.

If the described device is to be used, for instance, for cutting screw-threads, I employ a spindle or tool holder 23, (shown in Fig. 5,) provided with a keyway and adapted to slide longitudinally within the hollow spindle 7 on keys 22. The upper part of the spindle 7 is slit so that by tightening thereon the conical screw-cap 24 the spindle 23 can be rigidly clamped. To the lower end of the spindle 23 can be secured in suitable manner the die-holder 25. For drilling purposes the die-holder is removed, the spindle 23 reversed, inserted and clamped in the hollow spindle 7, and the drill 26 inserted, as shown in Fig. 6.

For showing the attained depth of feed, there is provided a graduation 27 on the casing 1, Fig. 1.

What I claim is—

A tool for cutting, shaping, drilling, thread-cutting and like purposes, comprising in combination, a casing, means for securing it to a fixed support, a centering-clutch forming the lower part of said casing, a sleeve threaded in said casing, a hollow spindle rotatable within said screw-sleeve, a cutting-head at the lower end of said hollow spindle, a handled ring rigidly secured on said hollow spindle, a stud mounted on said ring, a toothed friction-wheel operating on said stud, means to regulate the frictional resistance of said friction-wheel, pins radiating from said screw-sleeve and arranged to be engaged by said toothed friction-wheel, substantially as described.

In testimony whereof I affix my signature in presence of two witnesses.

RUDOLF BARTHOLOMÄUS.

Witnesses:
PAUL E. SCHILLING,
PAUL ARRAS.